United States Patent [19]
Schneider et al.

[11] Patent Number: 5,360,497
[45] Date of Patent: Nov. 1, 1994

[54] METHOD OF FORMING AN OPTICAL WAVEGUIDE WITH A REINFORCED PROTECTIVE COVERING

[75] Inventors: Reiner Schneider, Ebersdorf; Wilfried Reissenweber, Roedental, both of Germany; Norbert Niesemeyer, Hickory, N.C.

[73] Assignee: Siemens Aktiengesellschaft, Munich, Germany

[21] Appl. No.: 992,785

[22] Filed: Dec. 18, 1992

[30] Foreign Application Priority Data

Dec. 19, 1991 [DE] Germany .................. 4142047

[51] Int. Cl.$^5$ ........................................... B29C 47/02
[52] U.S. Cl. .................................. 156/47; 156/51; 156/244.12; 264/1.6; 264/149; 264/174; 264/1.28; 264/1.29
[58] Field of Search ............... 156/47, 51, 244.12; 264/1.5, 1.6, 149, 174

[56] References Cited

U.S. PATENT DOCUMENTS

| | | | |
|---|---|---|---|
| 4,269,024 | 5/1981 | Ashpole et al. | 264/1.5 |
| 4,486,252 | 12/1984 | Lloyd | 156/51 |
| 4,710,594 | 12/1987 | Walling et al. | 156/51 |
| 4,773,976 | 9/1988 | Vexler | 156/51 |
| 4,840,452 | 6/1989 | Federmann et al. | 264/1.5 |
| 4,956,039 | 9/1990 | Olesen et al. | 264/1.5 |
| 4,971,419 | 11/1990 | Gartside et al. | 264/1.5 |
| 5,199,094 | 3/1993 | Schneider | 264/1.5 |

FOREIGN PATENT DOCUMENTS

| | | |
|---|---|---|
| 0461871 | 12/1991 | European Pat. Off. |
| 3900901 | 7/1990 | Germany |
| 4020800 | 1/1992 | Germany |
| 2255742 | 11/1992 | United Kingdom |

*Primary Examiner*—Caleb Weston
*Attorney, Agent, or Firm*—Hill, Steadman & Simpson

[57] ABSTRACT

A method for covering at least one optical fiber with a protective layer comprises extruding the protective layer and embedding reinforcing elements in the protective layer to form a composite covering and simultaneously introducing the optical fiber into the composite covering. The method includes introducing a single waveguide or a plurality of waveguides, which may be formed into a bundle with a filling compound.

34 Claims, 7 Drawing Sheets

METHOD OF FORMING AN OPTICAL WAVEGUIDE WITH A REINFORCED PROTECTIVE COVERING

BACKGROUND OF THE INVENTION

The present invention is directed to a method for covering at least one optical waveguide with a protective layer and for applying reinforcing elements. In particular, the invention is directed to a method for covering at least one optical waveguide with a protective covering which surrounds the optical waveguide on all sides and is applied by extrusion together with reinforcing elements embedded in the covering.

DE-OS 39 00 901 discloses a method in which reinforcing elements are extruded in the form of threads from individual nozzles of an extruder, which nozzles are arranged around the periphery of a circle surrounding a bore. An optical waveguide, which is provided with a coating, is fed through a bore of the extruder head. In a subsequent stranding process, the reinforcing threads are applied with alternate directions of lay to the coating of the optical waveguide. An additional coating is then applied by means of another extruder. The reinforcing thread, thus, lies in a closed layer below the outer jacket or protective coating, which surrounds the whole structure. There is not a particularly strong bond between the outer protective covering and the underlying reinforcing threads so that a substantially two-layer structure results wherein both layers are independent of each other. Another disadvantage of this known method is that the threads consisting of liquid crystal polymers (LCP) or similar tension-resistant materials must be applied in an individual stranding process to the relatively thin and, therefore, sensitive optical waveguide, which has only been provided with one coating layer.

SUMMARY OF THE INVENTION

The present invention is directed to providing a method for covering an optical waveguide in a particularly simple manner, which optical waveguide has particularly good mechanical properties. The present invention provides a method of covering the optical waveguide with a protective covering having embedded reinforcing elements with the covering surrounding the optical waveguide. The method comprises the steps of forming a composite element comprising the protective covering and the embedded reinforcing elements in a coextrusion process and introducing the optical waveguide into the composite element during the coextrusion process.

Since the protective covering and the reinforcing elements embedded therein are manufactured together in a single working process, namely by coextrusion, only one extruder tool is required and the protective covering is manufactured together with the reinforcing elements in this stage of the method. Since the reinforcing elements are embedded directly into the protective covering during the manufacturing process and a tight connection results therebetween, they form a composite element which has high tensile strength, since the protective covering, on the one hand, and the reinforcing elements, on the other hand, are homogeneously connected to each other. This composite element, acting from the outside inward as a uniform layer, is applied with a tight fit on the optical waveguide. Thus, the optical waveguide is provided with a protective jacket, which is highly effective against traction or tensile forces.

Another aspect of the present invention provides an apparatus for covering an optical waveguide with a protective covering having embedded reinforcing elements. The apparatus includes an extruder head having a bore, an annular gap for extruding material of the protective covering surrounding the bore and nozzles for the extruding material of the reinforcing elements with the nozzles being disposed in a circular arrangement within the annular gap.

The present invention also provides an optical waveguide with a protective covering extruded thereon in which the protective covering contains embedded coextruded reinforcing elements and the material of reinforcing elements has a higher tensile strength than the material of the protective covering.

Another aspect of the present invention provides an optical cable with at least one buffer fiber in which the buffer fiber has a protective covering into which coextruded reinforcing elements and the material of the reinforcing elements has a higher tensile strength than the material of the protective covering.

Other advantages and features of the invention will be readily apparent from the following description of the preferred embodiments, the drawings and claims.

DESCRIPTION OF THE PREFERRED EMBODIMENTS

Figure 1:
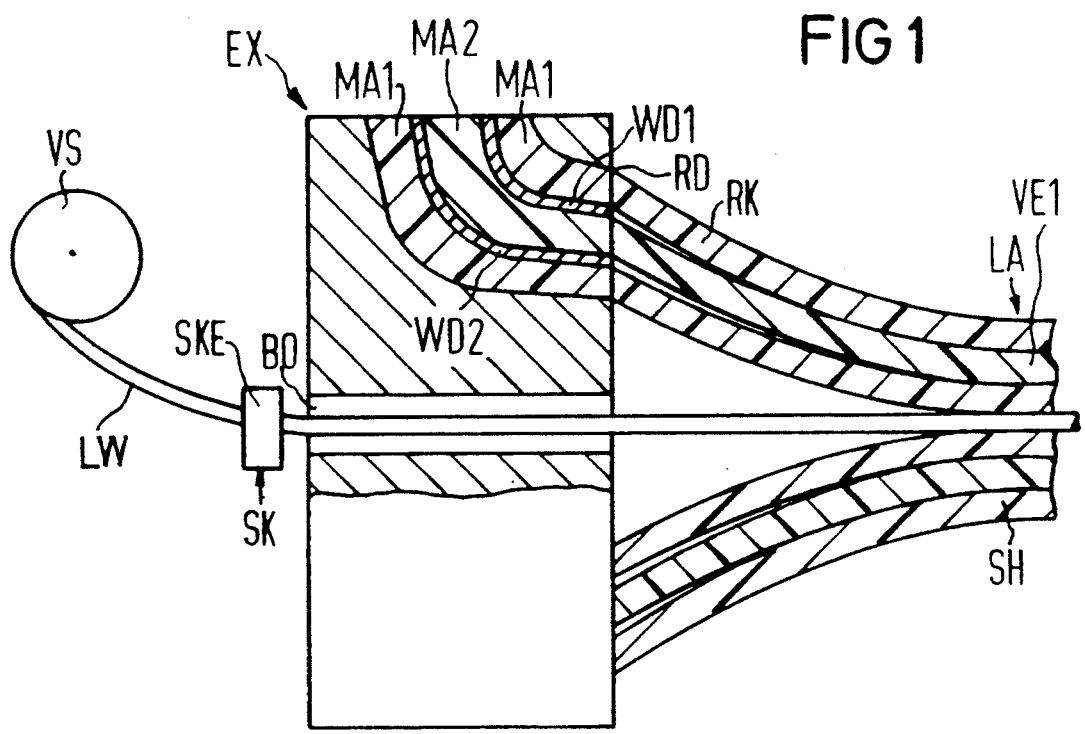
FIG. 1 is a side view with portions broken away for purposes of illustration of an apparatus for carrying out the method in accordance with the present invention.
Figure 3:
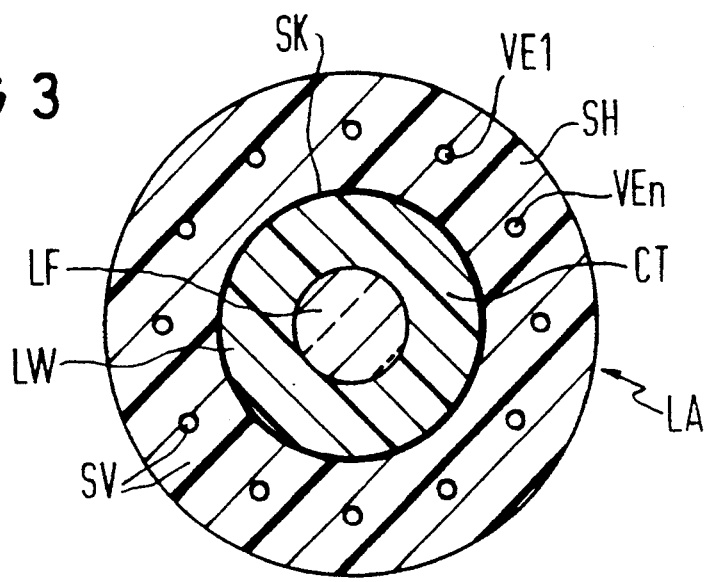
FIG. 3 is a transverse cross sectional view of an optical waveguide coated in accordance with the method of the present invention.

The principles of the present invention are particularly useful when incorporated in a device illustrated in FIG. 1 to manufacture an optical waveguide with a fixed core LA, as illustrated in FIG. 3.

Figure 2:
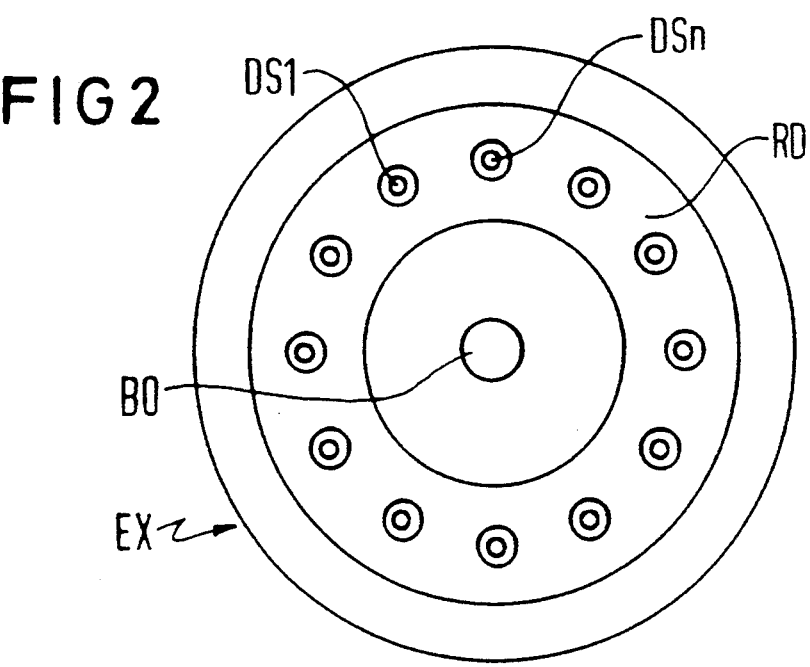
FIG. 2 is an end view of the gap and nozzle configuration of the device of FIG. 1.

The device or apparatus for forming the optical waveguide fixed core LA, as shown in FIG. 1, includes a supply coil VS from which the optical waveguide LW, which is provided with a protective coating, is withdrawn. The optical waveguide LW, as seen from the cross sectional presentation of FIG. 3, consists of an optical fiber LF consisting of a core and jacket material, as well as a single-layer or multi-layer protective coating CT, which is applied directly after the manufacturing process for the optical fiber LF. The optical waveguide LW is introduced into a bore BO of an extruder head, generally indicated at EX. The extruder head EX has an annular nozzle RD at its exit point, as shown on the right hand side in FIG. 1, and as illustrated in FIG. 2, and a first material is extruded through the nozzle RD to form the covering SH. The first material MA1 is selected from a group consisting of a high density polyethylene (HDPE), a low pressure polyethylene of low density (LLDPE), a polyethylene of average density (MDPE), a polycarbonate (PC), a polyamide (PA), a polybutylene terephthalate (PBT), a mixture of polycarbonate and polybutene terephthalate, polyphenylene sulphide (PPS), polyvinyl chloride (PVC), polyurethane (PUR), FRNC (flame retardant non corrosive) mixtures, polyetherimide (PEI), polytetrafluoroethylene (PTFE), ethylene/tetrafluorethylene (E/TFE), tetrafluorethylene/hexafluoropropylene (FEP) and a polyamidimide (PAI). Also, mixtures of the named materials are possible, wherein generally it can be said that it is preferable to use polymer materials which can be easily extruded and which also satisfy the other requirements for covering of the optical waveguides.

Distributed over the circular annular gap of the nozzle RD are provided individual nozzles DS1 to DSn (best illustrated in FIG. 2). Nozzles DS1 to DSn are arranged so that the material MA1 of the protective covering SH will flow around the nozzles on all sides. These nozzles, such as DS1, are separated from the flow of the covering material MA1 by the schematically indicated wall WD1 and WD2 and the material MA2 flows between the walls WD1 and WD2 of the nozzle DS1, for example, thus, generates a reinforcing element VE1. Each reinforcing element formed in this way, as illustrated in FIG. 3, correspondingly is embedded in the protective covering SH and these elements are surrounded on all sides by the material of the protective covering SH. With a circular structure of the nozzle opening correspondingly circular formations of the reinforcing elements VE1 through VEn, according to FIG. 3, are produced. It is also possible to select other, for example rectangular, cross sectional segments forms for the nozzle openings DS1 through DSn.

A stretch cone RK (see FIG. 1) produced by the coextrusion is stretched downward while still in the soft state onto the optical waveguide LW corresponding to the direction of travel from left to right. The structure illustrated in FIG. 3 is, thus, produced. The optical waveguide fixed core LA, in addition, is provided outside the coating CT with a composite element SV comprising strands VE of material MA2 embedded in a layer SH of material MA1. The protective covering SH with the embedded reinforcing elements VE1 sits in this example firmly on the coating CT.

Polycarbonates or liquid crystal polymers can be used as the material for the reinforcing elements VE1 through VEn. Due to the stretching process in the region of the stretch cone RK, these obtain the necessary orientation of their molecules and, therefore, the high tensile strength of this material. It is also possible to embed other high strength materials as reinforcing elements VE1 through VEn into the material of the protective covering SH, wherein advantageously the E-modulus of these elements should have 2 to 20 times the E-modulus of the material of the protective covering. Furthermore, in this context, the use of thermoplastics reinforced by threads as material MA2 is possible, wherein short fiber pieces can be embedded into the material MA2, these fiber pieces consisting of tension resistant glass fibers or carbon fibers or whiskers, for example. These fiber pieces of glass, metal or the like, advantageously should be selected to be longer than the diameter of the reinforcing elements VE1 through VEn in order to assure that these fiber-shaped elements are, in each case, embedded in the longitudinal direction of the reinforcing elements or are correspondingly aligned in the extrusion process. The length of these threads or fibers should, advantageously, be selected between 0.2 mm and 1.0 mm, and their diameter selected to be between 0.5% and 2.5% of the outer diameter of the reinforcing elements VE1 through VEn illustrated in FIG. 3.

In the embodiment according to FIG. 3, the composite element SV is firmly connected to the optical waveguide LW by being glued together, for example. This may be achieved when the plastic material of the coating CT and the plastic material of the protective covering SH form a homogeneous bond with each other. It is, however, possible, for example, to apply a fusion adhesive SK to the optical waveguide LW in a thin layer and, thus, to produce a solid bond between the composite element SV and the coating CT of the optical fiber core LW. For application of the fusion adhesive SK, the device SKE according to FIG. 1 can be used. Due to the high tensile strength of the composite element VS, a frictional lock connection between this composite element VS and the optical waveguide LW is normally possible without the optical waveguide being impaired, for example, by high tensile stresses.

If, however, particularly strong tensile stresses or other mechanical stresses occur, then it can be advantageous to provide a thin gap between the optical waveguide LW and the protective covering SH, which would occur in the exemplary embodiment according to FIG. 3 at a location of the fusion adhesive SK. This thin gap can be filled with a coupling medium, which can be formed, for example, of air of other slidable material, so that the traction forces which act on the protective covering SH are not transmitted directly to the waveguide LW. The width of this gap should be selected between 1 $\mu$m and 60 $\mu$m, wherein the preferred range of between 5 $\mu$ and 15 $\mu$m can be used. It is advantageous to use a coupling medium, which has thixotropic properties, for example, so that when there are shear forces, a liquifying of the coupling medium occurs in the correspondingly stressed region and the force transmission from outside to the optical waveguide LW can be kept particularly low. It is also possible, therefore, to use a rubber elastic, for example very soft, material as a coupling medium filling the gap, wherein the thickness of the layer is advantageously between 5 μm and 50 μm.

Advantageously, the reinforcing elements VE1 through VEn determine the physical properties of the composite element SV and are made of a material with a heat expansion coefficient corresponding approximately to that of the optical fiber LF according to FIG. 3. This requirement can preferably be realized by use of an LCP material for the reinforcing threads VE1 through VEn, because LCP material has a low coefficient of heat expansion in the region of $-10^{-7}$ to $+10^{-7}$ and with a corresponding selection of the stretching can be brought close to that of around $5.5 \cdot 10^{-7}$ for the light fiber LF.

The outer diameter of the optical fiber LF equipped, according to the invention, with the composite element SV, should approximately be 1.5 to 8 times the outer diameter of the optical fiber LF. Such dimension allows further processing, for example the stranding and cabling with the usual machinery in the traditional cable technology.

It can also be advantageous to coat the optical waveguide LW or the optical fiber LF with a lubricant, for example talcum, in order to improve the packaging. Thus, unrolling potential of the reinforcing casing will be improved.

The reinforcing elements VE1 through VEn are advantageously made of a material with an E-modulus which is greater than $5000 N/mm^2$. In contrast, it is sufficient for the material MA1 of the protective covering SH if this has an E-modulus greater than $200 N/mm^2$.

From the overall cross sectional area of the composite element SV according to FIG. 3, only between 4% and 20% of the surface area needs to be filled by the reinforcing elements VE1 through VEn. The proportion of the reinforcing elements VE1 through VEn is kept low on the overall cross sectional area of the composite element SV.

The reinforcing elements VE1 through VEn should, advantageously have a diameter which is selected to be approximately between 10% and 70% of the outer diameter of the bare optical fiber LF.

Figure 4:
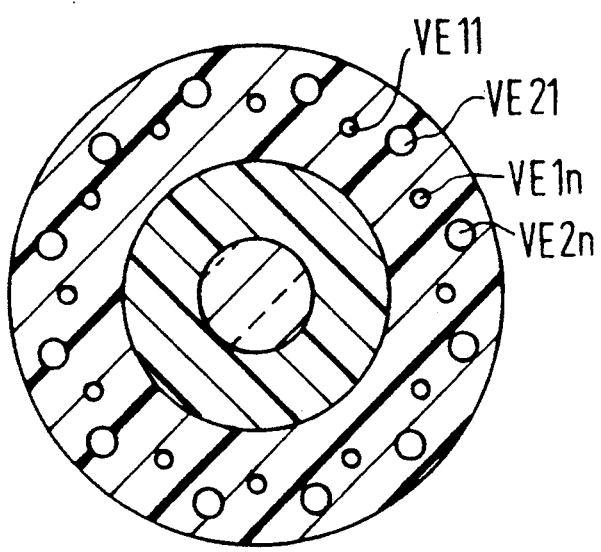
FIG. 4 is a transverse cross sectional view of an embodiment of a coated optical waveguide according to the method of the present invention.

It is also possible to provide several layers of reinforcing elements, as represented in FIG. 4. In this process, the outer layer with the elements VE21 to VE2n are advantageously designed with a greater diameter than the inner layer VE11 to VE1n. The greater diameter of the outer layer should improve the buckling strength when there are bending stresses.

The subsequent exemplary embodiments illustrate the application of the inventive thought for the manufacture of buffered fibers, for example an arrangement in which several optical fibers are arranged in the interior of a protective covering. In the device shown in FIG. 5 for manufacturing such buffered fibers, several supply coils VS1 through VSm are provided and they have optical fibers LW1 through LWm, which are provided with a protective layer coating.

These optical waveguides LW1 to LWm are removed and supplied to a filling device FE, by means of which the optical waveguides LW1 through LWm are embedded in a filling compound FC. The optical waveguides are arranged with a greater distance from each other than visible from the cross sectional representation of FIG. 6 and are loose, that is embedded to a certain extent in a mobile or displaceable manner in the filling compound FC. The pasty material can be used for the filling compounds SC, in particular materials with thixotropic properties and, possibly, with an oil addition. In each case, the viscosity of the filling compound FC should be selected so that the optical waveguide bundle covered with the filling compound FC can be led through the bore BO of the extruder EX without dripping off. The extruder EX has a similar construction to the embodiment illustrated in FIGS. 1 and 2 and, therefore, the same reference numerals are used for the same parts. Also, the supplied materials MA1 and MA2 have the properties or compositions described in connection with FIG. 1, described hereinabove. However, the diameter of the annular nozzle RD is selected to be correspondingly greater than the embodiment according to FIGS. 1 and 2, and also the gap width of this annular nozzle is to be widened corresponding to the altered requirement approximately relative to this arrangement.

Figure 6:
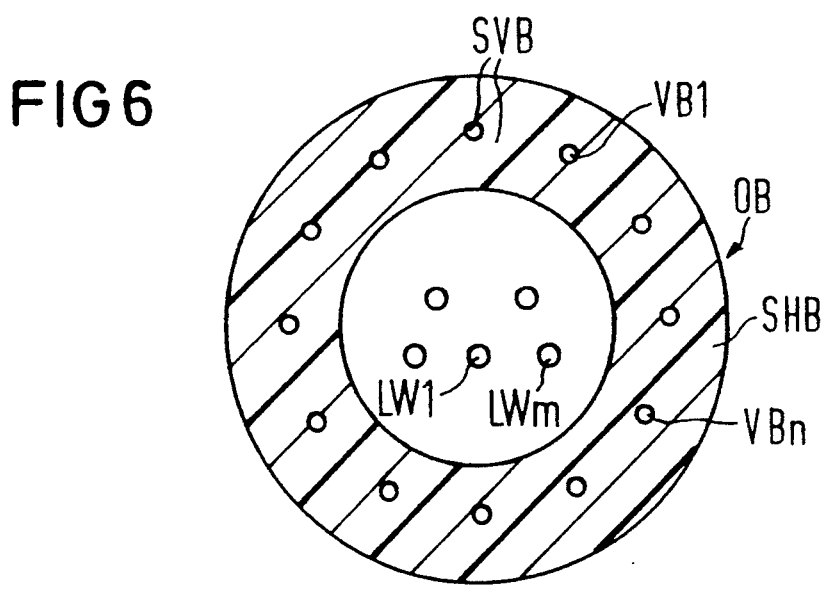
FIG. 6 is a transverse cross sectional view through a buffered fiber manufactured according to the device of FIG. 5.

The stretch cone RKB produced by the extruder EX is pulled down onto the filling compound bundle FB containing the optical waveguide, which essentially lie tightly one this, as seen in the cross sectional drawing of FIG. 6. The nozzle for the generation of the tension-proof elements VB1 through VBn, for example DS1, are arranged with the circular cross section in a similar manner to the nozzles DS1 to DSn according to FIG. 2. Therefore, corresponding circular reinforcing elements VB1 through VBn are also produced with the exemplary embodiments according to FIG. 6. The resulting optical buffered fiber OB, thus, contains a high tensile outer covering because of the reinforcing elements VB1 through VBn so that the optimum protection for the optical waveguides LW1 through LWn located in the interior is achieved. These optical waveguides can be produced with corresponding overlengths and can be accommodated in alternating positions in the interior of the protective covering SHB representing the composite elements. In addition, it is possible also for the waveguides to be loosely stranded or twisted with each other. The inner opening of the protective covering SHB is selected so that its cross section is, in each case, substantially greater than the overall cross section of the optical waveguides LW1 to LWm contained in it. The reinforcing elements VB1 through VBn are firmly embedded in the material of the protective covering SHB and produced together with this a connecting construction SVB with properties similar to those of the covering SH, which have been illustrated already with the aid of FIGS. 1–4.

Figure 7:
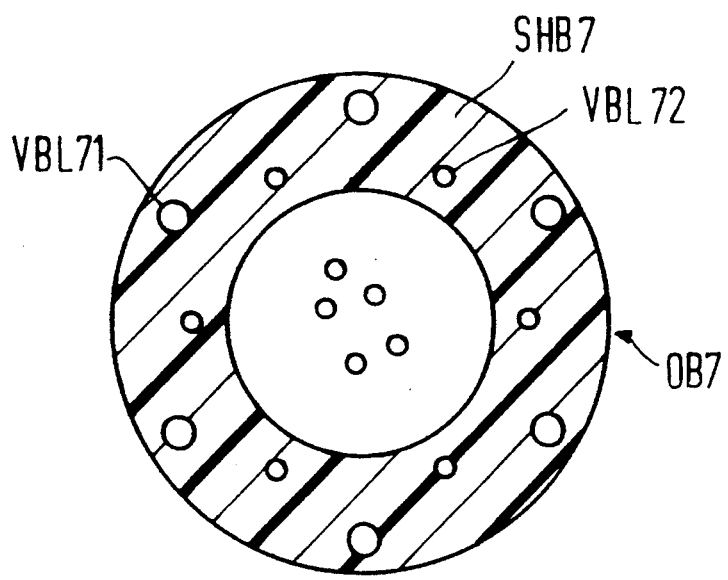
FIG. 7 is a transverse cross sectional view of a first modification of an embodiment of the buffered fiber in accordance with the present invention.

In FIG. 7, an exemplary modification is illustrated wherein two layers VBL71 and VBL72 of reinforcing elements are introduced into the protective covering SHB7. The outer layer VBL71 of these reinforcing elements lies on an assumed circle, which has a diameter that is greater than the circle for the layer VBL72 of the reinforcing elements that lies as an inward layer. Moreover, the reinforcing elements of the outer layer VBL71 and that of the inner layer VBL72 are arranged in each case in a staggered relationship with each other. In addition, it is provided that the elements of the outer layer VBL71 can be produced with a greater diameter than the tension-proof elements of the inner layer VBL72. This has the advantage that the covering is particularly rigid against buckling and can also absorb high compression forces.

Figure 8:
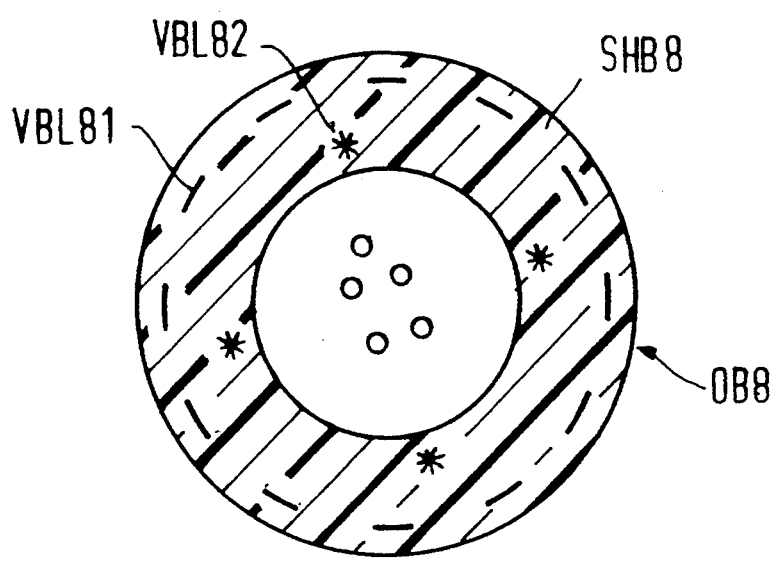
FIG. 8 is a transverse cross sectional view of a second modification of a buffered fiber in accordance with the present invention.

FIG. 8 shows another exemplary embodiment having an outer layer VBL81 of approximately band-shaped reinforcing elements, which are embedded in the protective covering SHB8. The band-shaped reinforcing elements extend approximately in the peripheral direction on an assumed circle. In addition, tensile-proof elements with an approximately star-shaped cross section are arranged on the inner layer VBL82. The elements of both layers VBL81 and VBL82 are also arranged staggered relative to each other. It should be pointed out that the cross sectional shape of these elements are formed by the cross section of the respective nozzle, such as DS1.

In the previous exemplary embodiments illustrated in FIGS. 5–8, the reinforcing elements have been introduced, in each case, in an even arrangement. A buffered fiber OB9 of FIG. 9 has reinforcing elements, for example VBL9, which can be in an uneven distribution over the cross section of the protective covering SHB9.

Figure 10:
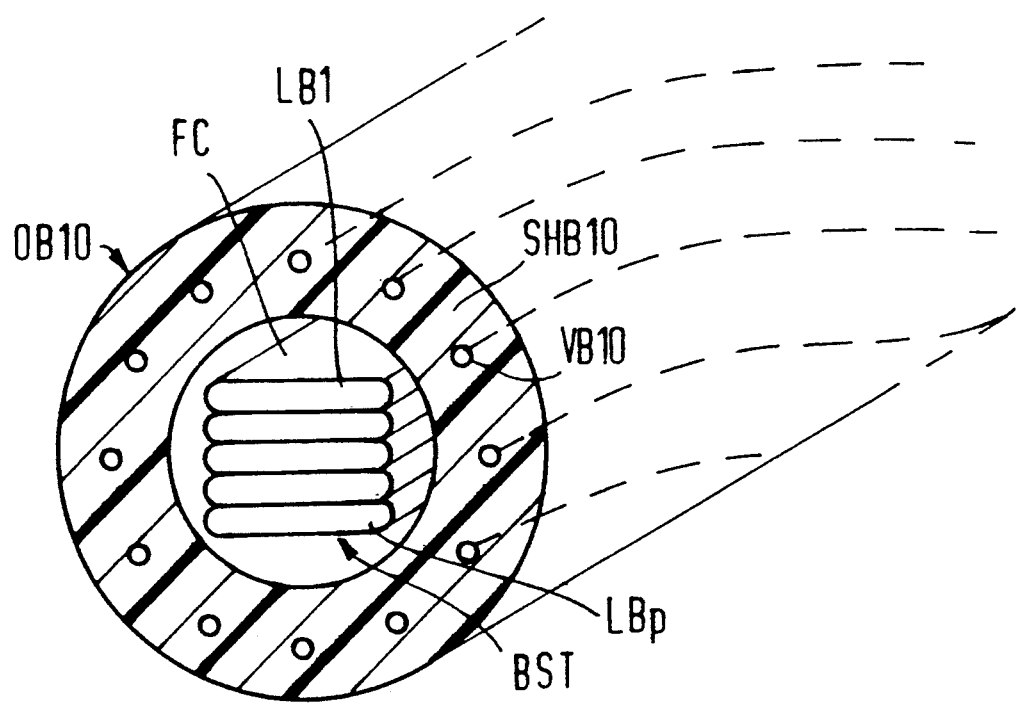
FIG. 10 is a perspective view with a transverse cross section of a fourth modification of a buffered fiber in accordance with the present invention.

FIG. 10 shows an exemplary embodiment of an optical buffered fiber OB10 in which the reinforcing elements, for example VB10, are seen in a longitudinal direction of the cylindrical protective covering SHB10 and extend approximately in a spiral shape. Such an arrangement can, for example, be produced in that the injection head, according to FIG. 5, is offset in rotation about the axis of the bore BO, so that the continuous extrusion produces spiral-shaped extending reinforcing elements VB10.

Figure 5:
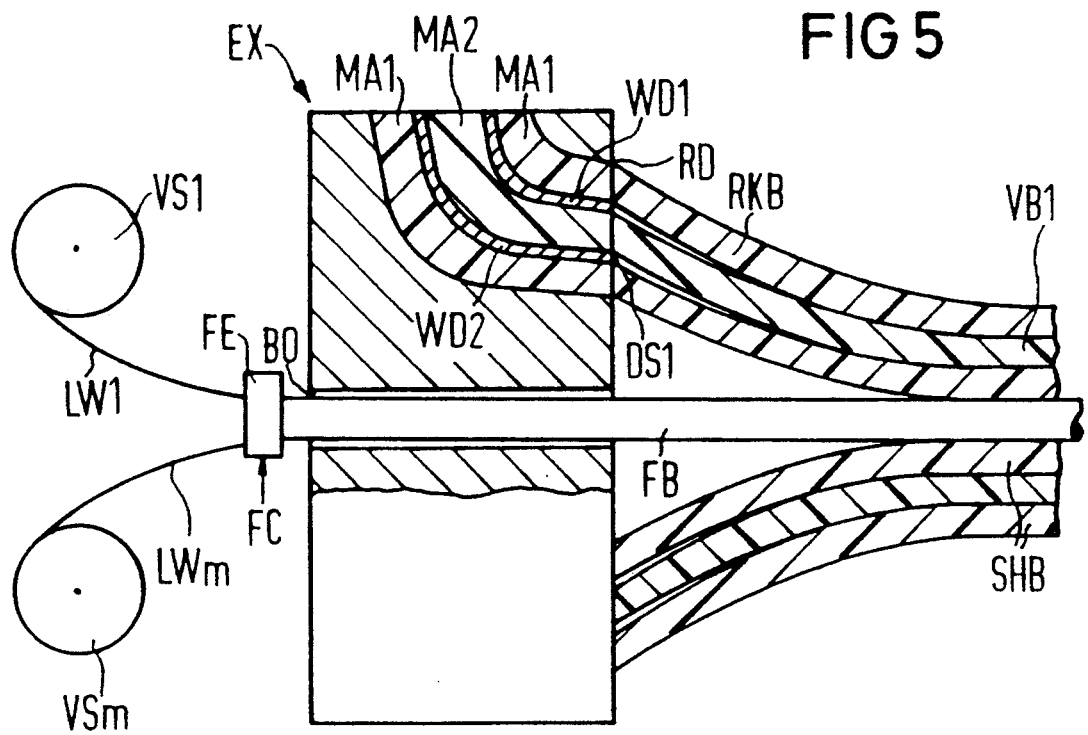
FIG. 5 is a side view with portions broken away of an apparatus in accordance with the present invention for manufacturing a buffered fiber.

If optical waveguide strips or bands are arranged on the supply coils VS1 through VSm, of the device of FIG. 5, these supply coils, for example, are arranged in carriage rotating in the same direction, preferably synchronous, so that a strip stack BST, which is formed by the optical waveguides strips or bands LB1 through LBp, will be twisted in a spiral shape in the interior of the protective covering SHB10. The rotation of the protective covering SHB10 occurs in the plastic state, and mainly in the region between the extruder head and the subsequent cooling trough. The rotation of the strip stack BST occurs through friction between the protective covering SHB10 and the strip stack, wherein the filling compound FC possibly functions as a carrier.

Figure 9:
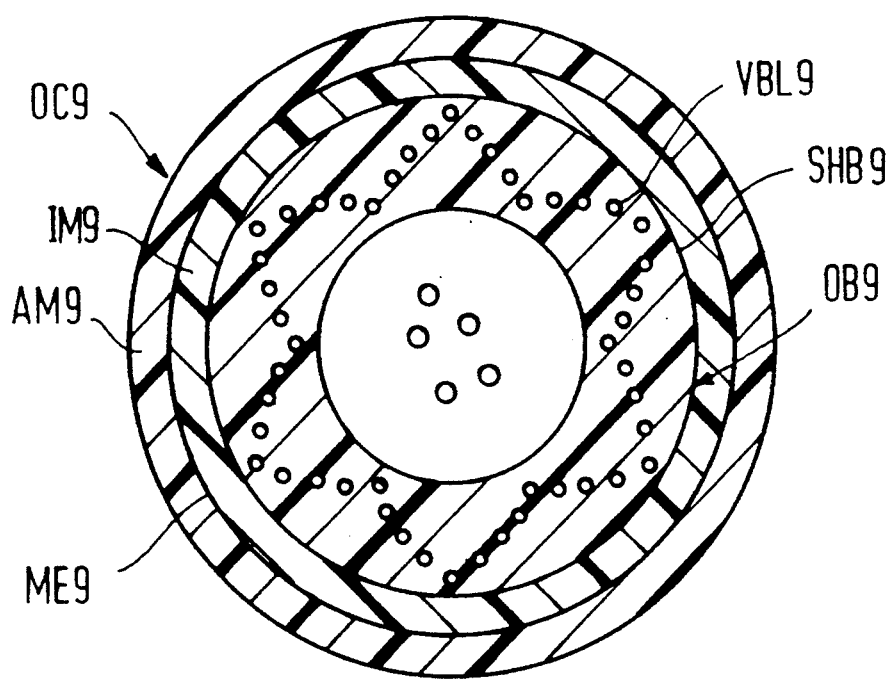
FIG. 9 is a transverse cross sectional view of a third modification of a buffered fiber in accordance with the present invention.

The optical buffered fibers corresponding to the embodiments of FIGS. 5–10, for example, form the core element of an optical cable. With the correspondingly strong formation of the protective covering, it is frequently not necessary to apply additional outer jackets. That is, the protective covering SHB to SHB10 containing the reinforcing elements practically represents the cable jacket at this stage. It is, however, also possible, as shown in FIG. 9, with corresponding particular requirements to provide the buffered fiber OB9 with additional outer layers, for example an inner jacket IM9 and an outer jacket AM9. Possibly, also, a layer jacket with an embedded metal band or foil ME9 can be applied in order to prevent water vapor diffusion on the optical cable OC9 obtained in this manner.

Figure 11:
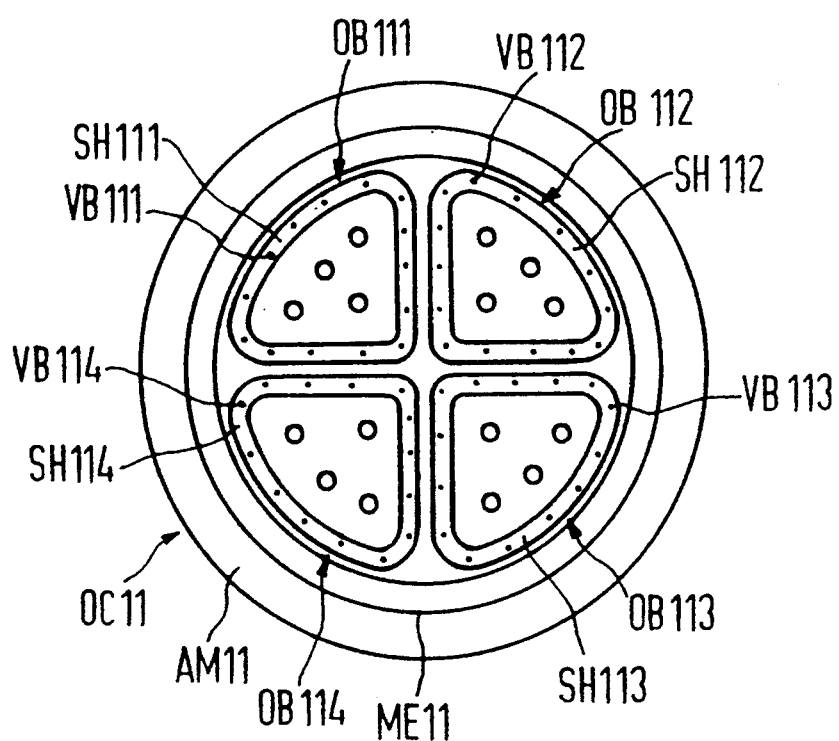
FIG. 11 is an end view of a cable composed of several buffered fibers in accordance with the present invention.

In addition to arrangements often called "maxi bundle" cables, with only one optical bundle, there is also the possibility of stranding several such optical buffered fibers SHB to SHB10, which are illustrated in FIGS. 6–10 to form a core of an optical cable. Then, a corresponding jacket is applied outside on this cable, which jacket can possibly also be formed in multi-layers. One particular embodiment of such an arrangement is shown in FIG. 11, where four optical buffered fibers OB111 through OB114 are stranded together and together form a cable core of an optical cable OC 11. Each of these optical bundles OB111 through OB114 has a protective covering SH111 to SH114 into which the tension-proof elements VB111 to VB114, respectively, have been embedded in a great number. For optimum use of the cross section of the cable core, the optical bundles OB111 to OB114 are provided with an approximately sector-shaped cross section and are packed with their sector-shaped faces or surfaces directly on each other, for example combined by stranding. In this way, a high tensile core construction can be obtained, even with the relatively thin wall thicknesses of the individual protective coverings SH111 to SH114 and, because the packed reinforcing elements VB111 to VB114, each of these bundles is particularly tension-proof and resistant. Such an optical cable OC11 can be manufactured, thus, in a particularly advantageous manner with high continuous speeds because through the robust construction of the optical bundle, the manufacturing process, for example the stranding process, can be maintained extensively without danger with regard to the mechanical stress. An impermissible stress of the optical waveguide in the interior of the optical bundle OB111 to OB114 is prevented by the particular protective effect of the especially constructed protective coverings SH111 to SH114.

The outer jacket AM11 of the optical cable OC11 can be formed in multilayers. It is possible also to contain a metal band or foil ME11 as a diffusion block or as a ground steel strip as a protection from rodents.

For the optical bundles OB5 to OB10, according to FIGS. 5–10, a wall thickness in the region of between 0.3 mm and 2.0 mm is advantageous. The inner diameter which serves to receive filling compound bundle FB containing the optical waveguide lies, in the exemplary embodiments according to FIGS. 5–10, approximately in the range of between 0.9 mm and 4.0 min. In the exemplary embodiment according to FIG. 11, the diameter of the circle to be described in the optical bundles OB111 to OB114 is to be selected advantageously between 0.8 mm and 5.0 mm.

The diameter of the tension-proof elements in FIGS. 5–11 lie approximately in the region of between 0.08 mm and 0.5 mm and the tension-proof elements advantageously fill only a proportion of 4% to 20% of the overall cross sectional area of the respective protective covering.

The wall thickness of the protective coverings according to FIGS. 5–11 can be kept particularly low because, in contrast to the traditional approximately tubular and relatively rigid constructions, the mechanical tensile strength is obtained in the first instance by the embedded reinforcing elements. Therefore, such optical bundles are also easy to mold without an impermissible stress of the optical waveguide located in the interior, because this deformation in the first instance acts in the radial direction, while an impermissible stress in the axial direction is prevented through the embedded tension-proof elements. In respect to the exemplary embodiment according to FIG. 11, it should be noted that the optical bundles OB111 to OB114 represented there need not necessarily be manufactured with a sector-shaped cross section initially. Rather, it is also possible to manufacture these optical bundles, for example, in the circular form approximately analogous to the shape in FIGS. 6–11 and not impress the sector shape, or with the multi-layer arrangement a partial sector shape, onto the respective optical bundles until the processing procedure, for example during stranding. This subsequent shaping is possible if the wall thickness of the respective protective covering is selected to be particularly low, preferably between 5% and 20% of the diameter of the covering.

The plastic material for the manufacture of the respective protective coverings can also consist of flame-resistant thermoplastics, or equipped with flame-resistant thermoplastics, wherein it is not necessary that the reinforcing elements for their part are equipped in a flame-resistant manner. Rather, these reinforcing elements can be made of a material which is not necessarily flame-resistant, since the reinforcing elements can be embedded and surrounded on all sides by the respective protective covering, wherein an orientation selection solely for tensile strength or possibly also the compressing properties can be paramount. The composite material of the protective covering, for example the respective optical bundle, is as a whole in any case flame-resistant and, to be more precise, independent of the characteristics of the respectively embedded reinforcing elements.

The reinforcing elements are advantageously designed so that they act as tension-proof elements, as well as support elements, for example counteract an expansion of the protective covering as well as compression of the protective covering. Through the supporting effect, it is achieved that the shrinkage in the longitudinal direction is substantially determined only by the embedded reinforcing elements or their properties. A relatively small proportion of the reinforcing elements relative to the overall cross sectional face of the protective covering is already sufficient in order to produce this determining property of the reinforcing elements if the E-modulus of the reinforcing elements is selected to be correspondingly greater than that of the protective covering. Such properties are particularly desirable if a defined length relationship should be adjusted relative to the protective covering for the optical waveguide or waveguides contained loosely in the interior of the protective covering. For example, it is possible with a smaller cross sectional proportion of the reinforcing elements compared to the overall cross section of the protective covering to adjust in an accurate manner the fiber overlength at room temperature to ±0.01% by a targeted contraction. In this way within the scope of the invention, it is possible to tackle the problem of length, which always occurs when covering the optical waveguides, and to adjust in an accurate manner a possible desired overlength or an exact zero-overlength. The protective covering is cooled in the manufacturing process from the outside, for example by cooling water, and from the inside by the filling compound in which the optical waveguide or waveguides are embedded.

Figure 12:
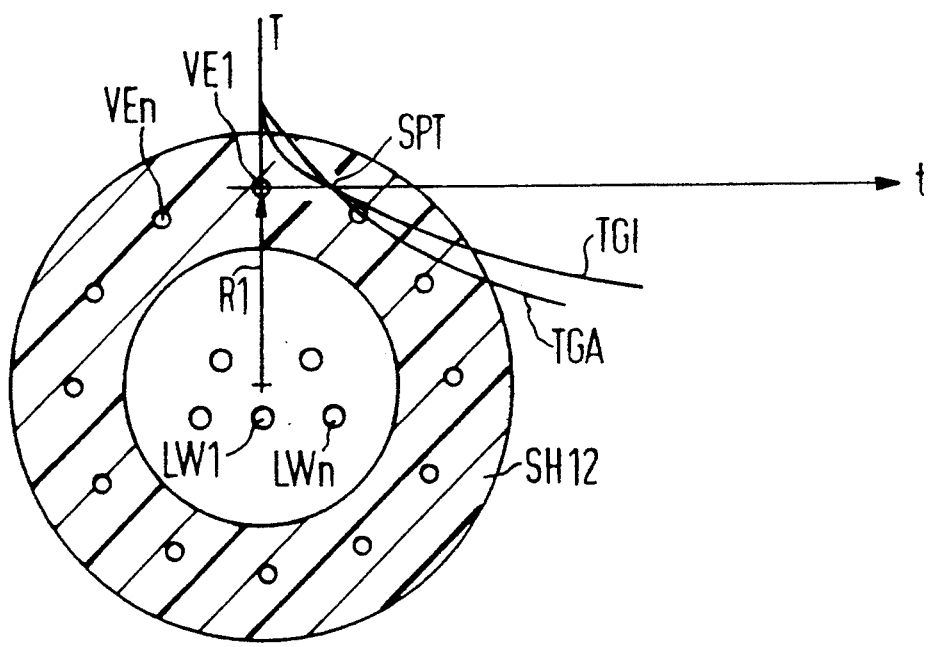
FIG. 12 is a schematic transverse cross sectional view of another buffered fiber manufactured in accordance with the present invention with a temperature-time curve superimposed thereon.

In order to illustrate the relationship, reference is made to FIG. 12, which shows the cross section of a protective covering SH 12 in which reinforcing elements VE1 through VEn are embedded. The tubular protective covering SH12 is cooled from the outside, for example, by cooling water and from the inside by the filling compound FC as soon as the protective covering SH has left the extruder head and has been stretched onto the outer surface of the filling compound FC. The reinforcing elements VE1 through VEn do not come directly into contact with either of the cooling agents, such as the cooling water from the outside or the filling compound FC from the inside. The reinforcing elements VE1 to VEn are rather cooled indirectly by the plastic layer SH12 of the tubular cross section surrounding them on all sides.

A plastic material is used advantageously as a material for the protective covering SH12, which material, with regard to the E-modulus, is many times lower than the material for the reinforcing elements VE1 to VEn embedded in the tubular cross section. Advantageous E-modulus values of SH 11 lie between $50N/mm^2$ and $2000N/mm^2$, preferably in a range of $300N/mm^2$ and $2000N/mm^2$. The material for the protective covering SH12 should moreover have the capacity, at room temperature, to break down gradually the stresses which were frozen, first of all, during cooling from the melting stage, i.e., the material should carry out a relaxation.

The material for the reinforcing elements VE1 to VEn should, advantageously, have the following properties:

Solidification temperature TV higher than solidification temperature TS of the protective covering SH12, for example TV=180° C., TS=160° C.

E-modulus large, preferably $1500N/mm^2$ to $50000N/mm^2$, i.e., approximately 5 to 50 times the E-modulus of the protective covering SH12. The material should also have a linear temperature expansion coefficient, preferably $\alpha \leq 8.10^{-5}/K$.

If the construction according to the invention is compared with a known two-layer covering, in which, for example, the inner layer consists of polycarbonate and the outer layer consists of a polyethylene, then the following significant advantages will occur from the solution according to the present invention:

a) The danger of the tension cracks, which is already reduced with the known construction through the tough-elastic outer polyethylene layer is again considerably reduced because the reinforcing elements VE1 to VEn do not come into direct contact with the constantly cooler filling compound FC after the extrusion process, but are rather gradually cooled indirectly by way of the material of the protective covering SH12;

b) With the known two-layer covering with a high tensile inner layer, there is the danger that tension cracks, which can occur at a point, for example through a material defect or an irregularity in the manufacturing process, will continue there and possibly extend to the overall cross section, for example around the periphery. With the invention, this is not the case, because, for example, a point of disturbance in the reinforcing element VE1 remains restricted to this element and does not cross over to adjacent reinforcing elements, for example the element VEn. In the worst case, therefore, with such a disorder in the material or in the manufacturing process, the result can be damage of an individual reinforcing element, not, however, of all of the reinforcing elements VE1 through VEn extending over the periphery of the jacket.

c) The reinforcing elements VE1 to VEn have no direct contact with the filling compound FC and it is, therefore, not necessary that notice is taken whether the material of the elements VE1 to VEn is also sufficiently resistant to this filling compound FC, for example, with regard to the solvents used in the filling compound, moisture, etc. Because the reinforcing elements VE1 to VEn are embedded on all sides in the material of the protective covering SH6, it is insured that no interaction can occur between the filling compound FC, on the one hand, and the reinforcing elements VE1 to VEn, on the other hand.

d) The covering construction, for example according to FIG. 12, results in a more compact arrangement without a continuous interface, such as occurs with known concentric multi-layer coverings. Through the embedding of the thin reinforcing elements VE1 to VEn with a relatively small cross section into the protective covering SH6, which, in contrast, is much greater in terms of volume, there is a substantially homogeneous shape, an improved embedding, a tighter mechanical bond and altogether a more favorable property. Materials can, therefore, be used for the reinforcing elements VE1 to VEn which also tend more to tension cracks, for example polycarbonate polyamide 6 or polyetherimide, because the problem of the sensitivity to tension cracks is reduced to a great extent with the design according to the present invention.

Some influences triggering tension cracks, such as states of high stress through various cooling behavior of the polymers and the influence of the wetting agents, that means agents which encourage tension cracks, are reduced because each supporting element VE1 to VEn is completely surrounded by the material of the protective covering SH6.

Advantageously in this context, the material of the protective covering SH12 can be extruded at a temperature which lies above the melting or fusing temperature of the reinforcing elements VE1 to VEn. The solidification of the reinforcing elements VE1 to VEn occurs with an indirect cooling via the covering material, wherein the actual cooling agents necessary for the cooling process, for example cooling water on the outside and the filling compound on the inside, does not come into direct contact with the embedded reinforcing elements VE1 to VEn. For these considerations, it can be advantageous, when the embedding location of the supporting elements are seen in the radial direction, to select the embedding location in a particularly advantageous manner on the basis of the following considerations.

In FIG. 12, the temperature gradient (temperature curve) TGA, which is produced through the quantity and the temperature of the outside cooling medium and dependent on the time for the cross section of the protective covering SH12 is represented for a fixed radial cross section, for example with the reinforcing element VE1. This temperature gradient TGA is steeper with the greater cooling that takes place from the outside, and flatter when less cooling takes place. This temperature gradient is, therefore, able to be freely selected, dependent on the desired conditions, because the outer cooling is a parameter which can be adjusted for the manufacturing process. In contrast, an inner temperature gradient TGI, which occurs for the inner wall of the protective covering SH12, is dependent only on the starting temperature of the filling compound FC and results substantially from the properties of the filling compound FC already present, and it is hardly able to change by any amount. Both temperature gradients TGI, which is dependent on the filling compound FC, and TGA, which is dependent on the outer cooling, for example water, intersect at a certain point which lies somewhere between the inner face and the outer face of the protective covering SH12. The associated radius is denoted by R1 and it is advantageous to arrange reinforcing elements VE1 just like the remaining reinforcing elements, approximately where the temperature gradients TGA and TGI intersect and to select the point of intersection SPT of both curves relative to the temperature T so that the solidification temperature RV of the reinforcing elements VE1 to VEn lies just there. The result of this is that with the respective reinforcing elements, for example VE1, approximately the same temperature is present at the inside and outside of the element. To illustrate these relationships, reference is made to FIG. 13, wherein an enlarged partial cut-away section of the protective casing SH12 is presented. The temperature TA present outside of the reinforcing element VE1 is substantially conditioned by the outer temperature curve TGA, while on the inside of the reinforcing element VE1, the temperature TI is present and is substantially obtained by the flatter inner temperature gradient curve TGI. The aim is that at the time of solidification, or the glass transition temperature of the reinforcing element VE1, the temperature TI is approximately the same as the temperature TA so that no tension due to the temperature occurs at the reinforcing element VE1, which would result in the reinforcing element VE1 attempting to bend. Thus, a tension freeze during the cooling process does not occur. At the time of the solidification of the reinforcing elements VE1 to VEn, approximately TV=TA=TI should be applicable. The freezing of tensions would also involve the danger of formation of cracks. If, on the other hand, the temperatures TA and TI are selected to be approximately the same at the moment of the solidification of the reinforcing elements VE1 to VEn, then no such state of tension condition occurs from the outset during the cooling process.

Thus, for a predetermined inner temperature gradient curve TGI and an outer temperature gradient curve, TGA, a position of the reinforcing elements can be selected so that the solidification temperature IV will come to lie approximately at the point of intersection of both curves TGI and TGA. Therefore, this point will be at a distance of R1 from the center point of the tubular composite protective covering SH12 of FIG. 12.

It is, however, also possible to alter the parameters which influence the temperature curves TGI and TGA, for example the temperature of the cooling water and the throughflow speed thereof, and the length of the cooling distance, so that the curves TGI and TGA intersect at such a point where the respective reinforcing elements VE1 to VEn are arranged in an optimum manner, for reasons of stability inside the protective covering SH.

Figure 13:
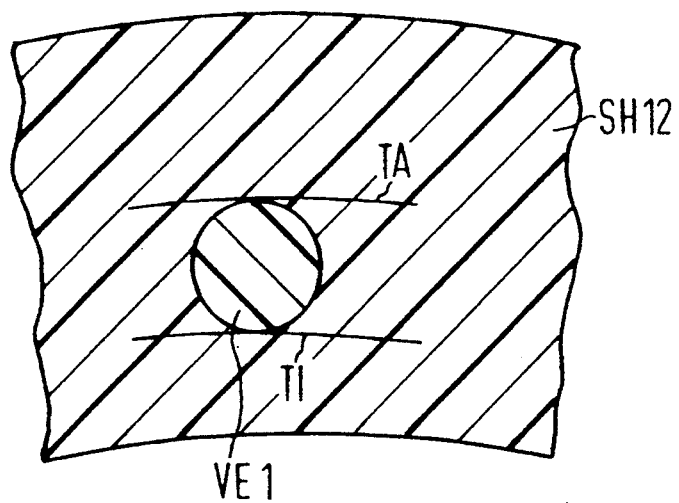
FIG. 13 is an enlarged cut-away portion of the buffered fiber according to FIG. 12.

The result is, again, for example, according to FIG. 13 inside the reinforcing element VE1, after the point in time or point of intersection SPT in FIG. 12, so that a temperature gradient between the temperature TA and TI and, namely in each case, a radial direction from the outside toward the inside. This temperature gradient is, however, no longer of particular importance, because in the meantime, the solidification of the reinforcing elements VE1 to VEn has occurred and the tensions are no longer frozen.

Through the embedding of the reinforcing elements VE1 to VEn in the covering material and the enveloping thereof on all sides by this covering material, chemical influence-encouraging tension cracks through components, for example, the filling compound or of the coating of the optical waveguides LW1 to LWn, as well as mechanical effects, encouraging tension cracks through the cooling behavior can be reduced or completely removed.

In terms of technology of the method, individual elements VE1 through VEn embedded into the material of the protective covering SH12 are also advantageous because of the important tool parts for an optimum shaping out of the fusion. For example, the respective spike or the nozzle only comes into contact with the material of the corrective covering SH6. In contrast to a two-layer covering of a known construction, the wall adhesion in the tool for forming out to the tube interior or outer side is almost the same. Neither can the results be deposited, the results of which would be flow interference. This danger exists with long-running times with the melting of these hard polymers. Because of this fact, it is guaranteed that various flow characteristics of the individual material combinations which can lead to the shear stress, even in the melted cone during the forming-out, do not occur.

Subsequently, three exemplary embodiments for the manufacture of the optical waveguide-core-protective are given:

EXAMPLE 1

Outer diameter of SH12: 2.8 mm;
Inner diameter of SH12: 1.7 mm;
Material of the protective covering SH12: polypropylene;
Material of the reinforcing elements VE1 to VEn: polycarbonate;
Number n of the reinforcing elements: 36;
Diameter 2(R1) of the partial circle on which VE1 to VEn are arranged: 2.0 mm;
Diameter of the reinforcing elements VE1 to VEn: 0.1 mm;
Filling compound FC: thixotropic hydrocarbon-filling compound;
Extrusion temperature TXS of the protective covering SH12: 230° C.;
Extrusion temperature TXV of the reinforcing elements VE1 to VEn: 270° C.;
Manufacturing speed: 200 m/min; and
Adjusted fiber length 0 to 0.1%.

EXAMPLE 2

Outer diameter of protective covering SH12: 6.0 mm;
Inner diameter of the protective covering SH12: 3.6 mm;
Material of the protective covering SH12: linear polyethylene;
Material of the reinforcing elements VE1 to VEn: polycarbonate;
Number n of the round reinforcing elements VE1 to VEn: 36;
Diameter of the reinforcing elements VE1 to VEn: 0.2 mm;
Diameter 2 (R1) for the partial circle of the reinforcing elements 4.4 mm;
Extrusion temperature TXS of the protective covering SH12: 225° C.;
Extrusion temperature TXV of the reinforcing elements VE1 to VEn: 270° C.;
Manufacturing speed: 40 m/min;
Fiber overlength: 6%; and
Cooling at intervals water/air and hot air distance.

EXAMPLE 3

Outer diameter of the protective covering SH12: 3.5 mm;
Inner diameter of the protective covering SH12: 2.1 mm;
Material of the protective covering SHG: polybutylene terephthalate;
Material of the reinforcing elements VE1 to VEn: polyamide 12;
Number n of the round reinforcing elements VE1 to VEn: 36;
Diameter of reinforcing elements VE1 to VEn: 0.15 mm;
Diameter 2 (R1) for the partial circle of the reinforcing elements: 2.5 mm;
Extrusion temperature TXS of the protective covering SH12: 260° C.;
Extrusion temperature TXV of the reinforcing elements VE1 to VEn: 260° C.;
Manufacturing speed: 120 m/min;
Fiber overlength: 0.025%; and
Cooling with cold water.

The extrusion temperature TXS of the protective covering SH12 is advantageously selected at or below the extrusion temperature TXV of the reinforcing elements VE1 to VEn.

Although various minor modifications may be suggested by those versed in the art, it should be understood that we wish to embody within the scope of the patent granted hereon all such modifications as reasonably and properly come within the scope of our contribution to the art.

We claim:

1. A method of covering an optical waveguide with a protective covering having embedded reinforcing elements with the covering surrounding the optical waveguide, said method comprising the steps of providing extrudable material and reinforcing elements with said reinforcing elements having an E-modulus which is greater than an E-modulus of said extrudable material, coextruding a composite element comprising a protective covering formed by said extrudable material with said reinforcing elements embedded therein and simultaneously introducing the optical waveguide into the composite element during the coextrusion process.

2. A method according to claim 1, wherein the reinforcing elements are surrounded on all sides by the protective covering and firmly embedded therein.

3. A method according to claim 1, wherein the composite element is composed of a material that in its entirety has a thermal expansion coefficient in the longitudinal direction which corresponds approximately to that of the optical waveguide.

4. A method according to claim 1, which further includes applying external cooling of the extruded covering and controlling the external cooling so that at the solidification temperature of the reinforcing elements, the elements are cooled in the radial outer and inner regions approximately to the same temperature.

5. A method according to claim 1 wherein the E-modulus of the reinforcing elements amounts to 2 to 20 times the E-modulus of the protective covering.

6. A method according to claim 1, wherein an E-modulus of the material of the reinforcing elements is selected to be in a range of between 1500N/mm$^2$ and 50000N/mm$^2$.

7. A method according to claim 1, wherein an E-modulus of the material of the protective covering is selected to be in a range of between 50N/mm$^2$ and 2000N/mm$^2$.

8. A method according to claim 7, wherein the E-modulus of the material of the protective covering is selected to be in a range of between 300N/mm$^2$ and 2000N/mm$^2$.

9. A method according to claim 1, wherein the protective covering is made of a material selected from a group consisting of polyethylene, polycarbonate, polyamide, polybutene terephthalate, polyvinyl chloride, polyurethane, polyetherimide, polytetrafluorethylene, ethylene/tetrafluorethylene, tetrafluoroethylene/hexafluoropropylene, polyamidimide or mixtures thereof.

10. A method according to claim 1, wherein the material for the reinforcing elements is selected from a group consisting of polycarbonates and liquid crystal polymers.

11. A method according to claim 1, wherein the material for the reinforcing elements includes whiskers and other short fibers inserted therein.

12. A method according to claim 1, wherein the material for the reinforcing elements has a temperature expansion coefficient which is lower than the temperature expansion coefficient of the protective covering.

13. A method according to claim 12, wherein the temperature expansion coefficient of the material of the reinforcing element $> 8 \cdot 10^{-5}/K$.

14. A method according to claim 1, wherein the material for the reinforcing element is selected so that the reinforcing element provides a supporting effect, in particular against longitudinal shrinkage forces of the protective covering.

15. A method according to claim 1, wherein the reinforcing elements are produced so that they occupy only a small proportion of the total cross sectional area of the protective covering.

16. A method according to claim 15, wherein the reinforcing elements are between 4% and 20% of the total cross sectional area of the protective covering.

17. A method according to claim 1, which includes positioning the reinforcing elements at a distance from the center of the protective covering so that at the solidification temperature of the reinforcing elements, the elements are cooled in their radial outer and inner regions approximately to the same temperature.

18. A method according to claim 1, wherein the step of introducing provides a single waveguide and wherein the composite element is arranged as a closed layer about the single optical waveguide in the form of a coating therefor.

19. A method according to claim 18, wherein the optical waveguide and the composite element have a narrow gap, preferably in the width of between 1 μm and 60 μm therebetween.

20. A method according to claim 18, wherein the composite element is connected in a friction lock manner with a coating of the optical waveguide.

21. A method according to claim 20, wherein the composite element is glued to the coating.

22. A method according to claim 18, which includes applying a coupling medium to the single optical waveguide prior to introducing the optical waveguide into the extruded composite element.

23. A method according to claim 22, wherein the step of applying a coupling medium applies a thin layer of soft material.

24. A method according to claim 22, wherein the step of applying a coupling medium applies a thin layer of thixotropic filling compound.

25. A method according to claim 22, wherein the step of applying the coupling medium applies a layer having a thickness in a range of 5μm to 15 μm.

26. A method according to claim 18, wherein the composite element is applied and has a wall thickness so that the outer diameter of the optical waveguide core obtained is 1.5 to 8 times the diameter of a bare optical fiber of the single waveguide.

27. A method according to claim 1, wherein the step of introducing an optical waveguide includes drawing several optical waveguides from supply coils, assembling the optical waveguides into a loose arrangement and then introducing said loose arrangement into the extruded composite element to form a buffered fiber.

28. A method according to claim 27, which includes adding a filling compound to the arrangement of optical elements to form a filled bundle introduced into the composite element.

29. A method according to claim 27, wherein the buffered fiber is used as a central element of an optical cable.

30. A method according to claim 29, which includes applying an outer jacket on the buffered fiber.

31. A method according to claim 30, wherein said step of applying an outer jacket applies more than one layer to form a layered jacket.

32. A method according to claim 27, wherein the several composite buffered fibers are stranded to each other to form a bundle.

33. A method according to claim 27, wherein an injection head of an extrusion die is rotated during the manufacturing process to create a helical arrangement for the reinforcing elements in the protective covering.

34. A method according to claim 33, wherein run-off coils for the optical waveguides are rotated during the manufacturing process to create a spiral arrangement of the optical waveguides in the protective covering.

* * * * *